Nov. 24, 1959   F. J. LINDHOLM   2,914,102
FEELER DEVICE FOR SAW BLADE STEERING MECHANISMS
Filed Feb. 5, 1958
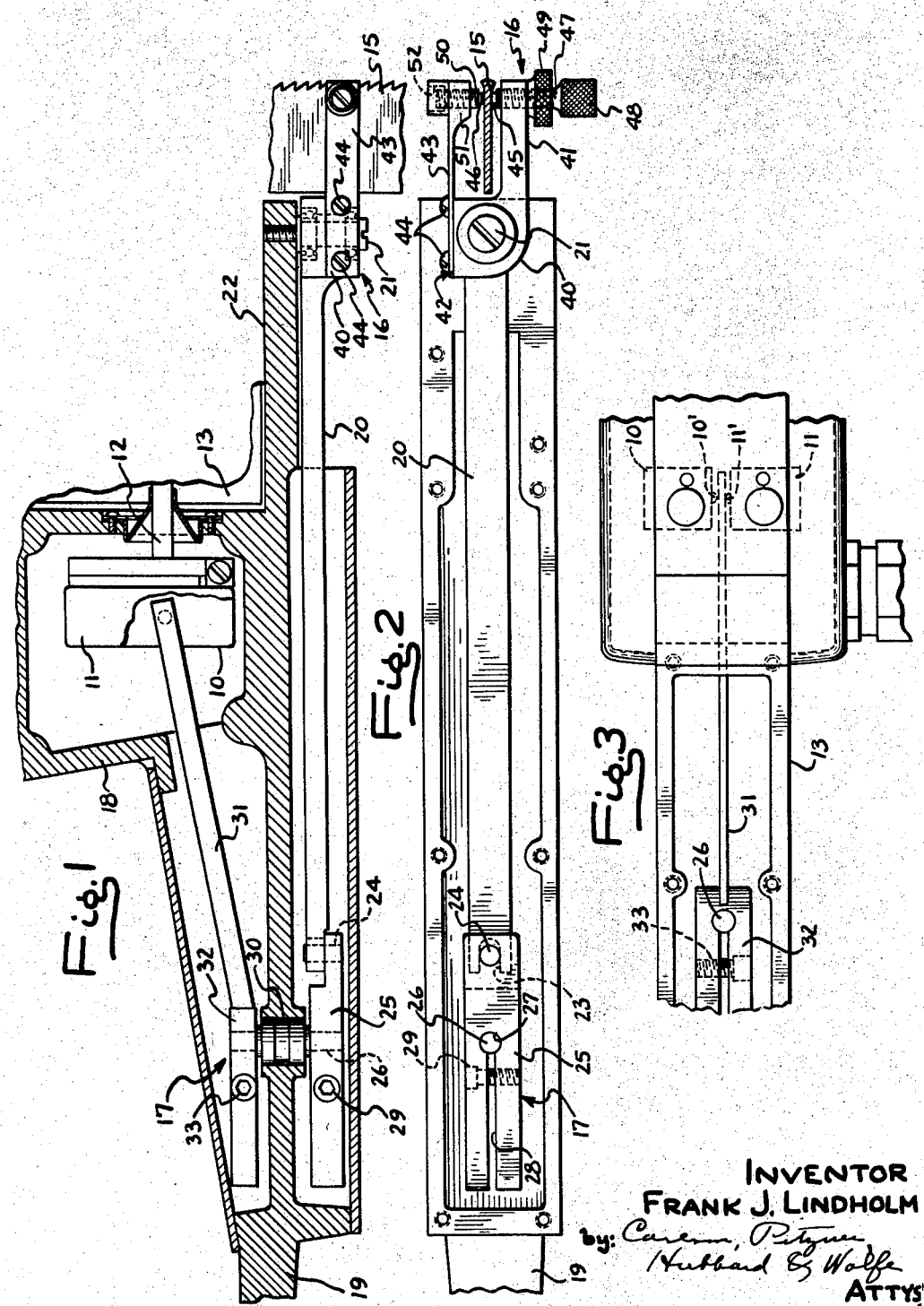
INVENTOR
FRANK J. LINDHOLM
ATTYS

United States Patent Office 2,914,102
Patented Nov. 24, 1959

2,914,102
FEELER DEVICE FOR SAW BLADE STEERING MECHANISMS

Frank J. Lindholm, Park Ridge, Ill., assignor to Armstrong-Blum Manufacturing Company, Chicago, Ill., a corporation of Illinois Application February 5, 1958, Serial No. 713,363

5 Claims. (Cl. 143—160)

The invention relates to mechanism for correctively steering the blades of saws and comparable cutting machines and it is more particularly concerned with an improved feeler device or detector for sensing the departure of a saw blade from a desired line of cut and for controlling steering mechanism so as to bring the blade back into line.

While not limited to such use, the invention is especially well adapted for application to band saws. The blades of such saws, particularly when used for metal cutting, are subject to unbalanced wear or often develop unbalanced cutting characteristics which cause the blade to cut faster on one side than on the other. This results in the blade drifting progressively away from a desired line of cut or developing run-off in the direction of the sharper or faster cutting edge. Mechanism has been developed for imparting a corrective twist to such saw blades to steer them back to the desired straight cutting path. Mechanism of that type is disclosed and claimed in my copending application, Serial No. 623,605, filed November 21, 1957.

The functioning of a blade steering mechanism of the above general character requires the detection of any tendency of the blade to drift or depart from the desired cutting path and the transmission of an appropriate signal to the mechanism. The sooner the drift is detected and corrected, the straighter the cut made by the blade. With this in view, one object of the invention is to provide an improved feeler device for band saw blades which is extremely quick and precise in detecting the slightest tendency of a saw blade to drift from a desired cutting path.

Another object is to provide a feeler device for band saw blades which operates without lost motion or backlash by maintaining a very light yet positive contact with the running saw blade at all times. A related object is to provide a feeler device of the above type which is unaffected by variations in the thickness of the blade. Another related object is to provide a feeler device that is self-compensating for wear of the blade contacting elements.

It is also an object of the invention to provide a feeler device for band saw blades which is simple and rugged in construction, efficient and reliable in operation and easy to adjust for a "null" condition and for use with blades of different thicknesses.

Other objects and advantages of the invention will become apparent from the following detailed description of the preferred embodiment illustrated in the accompanying drawings in which Figure 1 is a partly sectioned side elevational view of a band saw blade feeler device embodying the features of the invention.

Fig. 2 is a bottom view of the feeler device shown in Fig. 1.

Fig. 3 is a fragmentary plan view of the control switch operating linkage associated with the feeler devices.

While a single preferred embodiment of the invention has been shown and will be described herein in detail, it is to be understood that this is not intended to limit the invention to such details, the intention being to cover all modifications and adaptations falling within the spirit and scope of the invention as expressed in the appended claims.

For purposes of illustration the invention has been shown as embodied in a band saw equipped with blade steering mechanism of the type disclosed in my copending application above identified. That mechanism includes electrically driven means for imparting a corrective twist to a band saw blade in one direction or the other upon receipt of an appropriate signal indicating a departure of the blade from a predetermined cutting path and the direction of such departure. The corrective twist is imparted to the blade through the medium of guides engaging the blade above and below the work. Such guides are mounted to pivot about a common axis substantially coincident with the toothed edge of the blade and having rearwardly extending corrector arms by which the pivotal movements are imparted.

The signals in this instance are produced by the selective operation of a pair of microswitches 10 and 11 suitably connected with the electrically driven blade twisting means. The arrangement is such that actuation of one of the switches, for example, the switch 10, causes the driven means to twist the blade toward the right to correct for a runoff of the blade to the left. Actuation of the other switch 11 causes the mechanism to twist the blade in the opposite direction to correct a runoff to the right.

As herein shown, the switches 10 and 11 are mounted on a fixed support 12 secured to a rigid portion 13 of the band saw frame structure at the rear of and adjacent the section of the blade 15 presented to the work. The switches are operated selectively in accordance with the position of the saw blade by a feeler device or detector 16 cooperating with the blade and acting through an amplifying linkage 17. The switches in this instance are enclosed within a housing 18 mounted on and forming a part of a support for the upper guide for the blade 15.

As explained in detail in my copending application, the guide support is mounted for limited pivotal movement about an axis coincident with the toothed edge of the blade 15. Pivotal movements are imparted to the guide to apply a twist to the blade through the medium of a corrector arm 19 extending rearwardly to the drive means.

The linkage 17 in its preferred form includes an amplifying arm 20 pivotally mounted at its forward end by a stud 21 on an extension 22 of the corrector arm. The pivotal axis of the amplifying arm is thus located closely adjacent the rear edge of the blade 15 and extends parallel to the desired cutting path of the blade. At its rearward end the arm 20 is formed with a slot 23 positioned to receive a pin 24 fixed to the forward end of a lever 25 nonrotatably secured to the lower end of a spindle 26. In the particular embodiment illustrated the lever 25 is formed with a socket 27 for receiving the spindle. A slot 28 extends rearwardly from the socket to define spaced tongues adapted to be drawn together by a screw 29 to securely clamp the lever to the spindle.

As shown in Fig. 1, the spindle 26 is rotatably supported on the corrector arm by a bearing 30, preferably of the antifriction type. The projecting upper end of the spindle carries a switch operating finger 31 which extends between the switches 10 and 11 for cooperation with their respective actuating plungers 10' and 11'. The switches may thus be actuated selectively by turning the spindle 26 in one direction or the other. In the exemplary embodiment the finger 31 is rigidly secured to the spindle as by a split clamping block 32 provided with a clamping screw 33.

The detector or feeler device 16 is adapted to function as an extension of the amplifying lever 20 and projects forwardly from the pivot of the amplifying lever to cooperate with the saw blade 15. In accordance with the invention the feeler device is constructed to provide a base 40 formed with an integral extension or finger 41 adapted to project along one side of the saw blade. The base 40 may be formed integrally with the lever 20 or rigidly secured thereto in any suitable manner. In either case, it is apertured for the reception of the stud 21 by which the lever is pivotally mounted.

As shown in Fig. 2, one side of the base 40 is formed with a flat face 42 for convenient mounting of a second finger 43 which is removably secured to the base as by screws 44. The face 42 is located so that the finger 43 extends parallel to the finger 41 and projects along the other side of the blade 15. The two fingers thus straddle the blade and extend substantially to its forward or toothed edge.

To enable the fingers to monitor the position of the blade, contact elements 45 and 46 are provided on the respective fingers for direct engagement with opposite sides of the blade closely adjacent its toothed edge. The contact elements are preferably made of hard material such as tungsten carbide or other suitable wear resisting material.

Contact element 45 is carried at the end of an adjusting screw 47 threaded through the finger 41. As shown the screw is formed with a knurled head 48 for convenient manual manipulation. A knurled lock nut 49 threaded on the screw provides for locking it securely in adjusted positions.

Contact element 46 is likewise carried on the end of an adjusting screw 50 threaded through the finger 43. Preferably the finger is formed with a boss 51 to accommodate the screw and the outer portion of the boss is counterbored to form a recess 52 to receive the head of the screw. As will be seen by reference to Fig. 2, the contact screws are axially alined and located so that the contact elements are directly opposed and engage the blade as close as possible to the toothed edge.

In carrying out the invention, one of the feeler fingers, in this instance, the finger 43, is constructed so as to have a substantial degree of resiliency in a direction transverse to the plane of the saw blade with which it is to coact. To this end, the finger 43 comprises a relatively thin strip of metal or other suitable material having the required resiliency. The resiliency of the finger permits adjustment of the contact elements to exert a predetermined pressure against the sides of the blade and the pressure remains substantially constant even when blade thickness varies. Moreover, wear of the contact elements which is very slight due to the use of hard material, is automatically compensated by the action of the resilient finger.

The feeler device may be quickly and easily adjusted for a "null" condition, that is, to position the linkage precisely midway between the two control switches when the saw blade is accurately alined in a desired cutting path. The continuous positive contact with the blade insures instantaneous response of the device to any departure of the blade edge from the desired cutting path. Upon such departure the feeler device 16 pivots about the stud 21 and this pivoting movement is amplified by the linkage 17 to actuate one or the other of the control switches. As before explained, the actuation of the control switch initiates the operation of the steering mechanism to effect the necessary corrective action by swinging the corrector arm 19. Since the feeler device and its amplifying linkage are carried by the corrector arm, a positional adjustment of those elements takes place with the movement of the arm so that overcorrection of the blade position is avoided.

The provision of the resilient feeler finger enables the feeler device to compensate for variations in the thickness of the saw blade so that its runoff detecting functions are completely unaffected by such variation. Thus, when a thicker section of the blade passes between the two contact elements, the resilient finger yields or allows the fingers to spread apart without rocking the feeler device and the associated amplifying lever 20. However, when the plane of the blade departs even slightly from that required for a straight cut, pressure is increased on one contact element and correspondingly decreased on the other element so that the feeler device and amplifying lever rock about the pivot 21 to actuate one or the other of the control switches. Since there is no lost motion between the blade and the contact elements 45 and 46, response of the feeler to the runoff of the blade is substantially instantaneous and is precisely proportioned to the extent of blade departure from the desired cutting path.

Initial adjustment of the steering mechanism and feeler device can be effected very quickly and easily. Thus, with the blade free of the work and alined in the desired cutting path and with the switch operating finger 31 positioned midway between the switch plungers 10' and 11', the contact carriers 47 and 50 are screwed in or out until the contact elements 45 and 46 engage the sides of the blade. Suitable markings may be provided on the amplifying arm and an adjacent stationary portion of the frame structure to afford a visual indication of the centered or "null" position of the switch operating finger. The contact carriers can thus be easily adjusted to exert the desired pressure on the blade without displacing the switch finger from the null position. Once the adjustment is made, no change is necessary as the feeler device automatically compensates for variations in blade thickness and for wear of the contact elements.

It will be apparent from the foregoing that the invention provides a feeler device of novel and improved construction for monitoring the line of cut made by a moving saw blade such as the blade of a band saw. More particularly, it provides a simple, yet practical, means of instantly detecting the least departure of the blade from a desired cutting path. The provision for resiliently supporting one of the blade contacting elements permits the maintenance of a continuous direct contact with both sides of the blade at all times. Play or lost motion between the blade and the feeler device is thus eliminated and the device is thus enabled to respond instantly to the slightest departure of the blade from its desired path.

The feeler device is self-compensating for variations in blade thickness and its accuracy of operation is completely unaffected by such variations. Wear of the contact elements is also automatically compensated so that the pressure exerted on the blade remains substantially uniform. Contact pressure can be made very light without the sacrifice of speed or accuracy of response. As both the fixed and resiliently mounted contact elements are adjustable, the improved feeler device may be quickly and easily adjusted for a null condition and as quickly and easily adjusted for operation with blades of different thickness.

I claim as my invention:

1. A feeler device for detecting the departure of a running saw blade from a predetermined cutting path comprising in combination, a base supported adjacent one edge of the blade for pivotal movement about an axis parallel to the blade edge, fingers projecting from said base and extending along opposite sides of the blade, contact elements carried by said fingers engaging opposite sides of the blade adjacent its toothed edge, one of said fingers being rigid and the other finger having sufficient resiliency to maintain said elements in continuous engagement with the blade regardless of variations in the thickness of the blade.

2. A feeler device for detecting the departure of a running saw blade from a predetermined cutting path comprising in combination, a base supported adjacent one edge of the blade for pivotal movement about an axis parallel to the blade edge, a rigid finger projecting from said base and extending along one side of the blade, a resilient finger projecting from said base parallel to said rigid finger and extending along the other side of said blade, and contact elements carried by said fingers engaging opposite sides of the blade adjacent its toothed edge, said resilient finger permitting compensating contact movement for variations in blade thickness while allowing the finger to rock the device about its pivot upon departure of the blade from a desired cutting path.

3. A feeler device for detecting the departure of a running saw blade from a predetermined cutting path comprising in combination, a base supported adjacent one edge of the blade for pivotal movement about an axis parallel to the blade edge, a rigid finger projecting from said base and extending along one side of the blade, a resilient finger projecting from said base parallel to said rigid finger and extending along the other side of said blade, contact carrying elements threaded through the respective fingers in axially alined opposed relation, and hardened contact elements carried on the ends of said screw elements for direct engagement with the sides of the saw blade.

4. The combination with mechanism for correcting steering of a running band saw blade upon departure of the blade from a predetermined cutting path including a detector amplifier arm and means pivotally supporting said arm adjacent the rear edge of the saw blade to swing about an axis parallel to the blade, a feeler device rigid with said arm including a pair of fingers positioned to straddle the blade, and contact elements carried by said fingers engaging opposite sides of said blade, one of said fingers being sufficiently resilient to maintain contact pressure in the blade substantially uniform regardless of variations in the thickness of the blade.

5. The combination with mechanism for correcting steering of a running band saw blade upon departure of the blade from a predetermined cutting path including a detector amplifier arm and means pivotally supporting said arm adjacent the rear edge of the saw blade to swing about an axis parallel to the blade, a feeler device rigid with said arm including a first finger extending along one side of the saw blade, a second finger extending parallel to said first finger and along the other side of the saw blade, one of said fingers having a substantial degree of resiliency in a direction transversely of the plane of the saw blade, and contact elements adjustably mounted on said fingers in position to engage opposite sides of the blade adjacent its toothed edge.

References Cited in the file of this patent

UNITED STATES PATENTS

| | | |
|---|---|---|
| 2,291,830 | Obenshain | Aug. 4, 1942 |
| 2,709,588 | Staege | May 31, 1955 |

FOREIGN PATENTS

| | | |
|---|---|---|
| 371,666 | Great Britain | Apr. 28, 1932 |